United States Patent
Caveney et al.

(10) Patent No.: US 7,112,090 B2
(45) Date of Patent: Sep. 26, 2006

(54) HIGH DENSITY KEYSTONE JACK PATCH PANEL

(75) Inventors: Jack E. Caveney, Hinsdale, IL (US); Mark J. Donnell, Orland Park, IL (US); Paul B. Ducharme, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/843,919

(22) Filed: May 12, 2004

(65) Prior Publication Data

US 2004/0229501 A1 Nov. 18, 2004

Related U.S. Application Data

(60) Provisional application No. 60/486,682, filed on Jul. 11, 2003, provisional application No. 60/470,262, filed on May 14, 2003.

(51) Int. Cl.
*H01R 13/60* (2006.01)

(52) U.S. Cl. .................................. 439/540.1; 439/676

(58) Field of Classification Search ............... 439/532, 439/536, 540.1 I, 552, 557, 676
See application file for complete search history.

(56) References Cited

U.S. PATENT DOCUMENTS

| | | | |
|---|---|---|---|
| 4,909,757 A | | 3/1990 | Reed |
| 5,639,267 A | * | 6/1997 | Loudermilk ................ 439/701 |
| 6,086,415 A | * | 7/2000 | Sanchez et al. .......... 439/540.1 |
| 6,123,577 A | | 9/2000 | Contois et al. |
| 6,203,379 B1 | | 3/2001 | Cai et al. |
| 6,206,725 B1 | | 3/2001 | Wu |
| 6,238,243 B1 | * | 5/2001 | Lorenz et al. .............. 439/553 |
| 6,537,106 B1 | * | 3/2003 | Follingstad ................ 439/534 |
| 6,585,540 B1 | * | 7/2003 | Gutierrez .................... 439/620 |
| 6,736,670 B1 | * | 5/2004 | Clark et al. ............. 439/540.1 |
| 6,866,541 B1 | * | 3/2005 | Barker et al. ............ 439/540.1 |
| 6,896,542 B1 | * | 5/2005 | Chang ........................ 439/490 |

\* cited by examiner

*Primary Examiner*—Thanh-Tam Le
(74) *Attorney, Agent, or Firm*—Robert A. McCann; Christopher S. Clancy

(57) ABSTRACT

A patch panel is disclosed. The patch panel includes a frame, a faceplate mountable to the frame, and at least one keystone style modular jack mountable into a rear side of the faceplate. The frame has a top flange and a bottom flange, and the frame includes a plurality of openings. The faceplate is mountable to the frame within the top flange and the bottom flange, and the faceplate has a plurality of mounting openings. A method for assembling a patch panel is also disclosed.

19 Claims, 14 Drawing Sheets

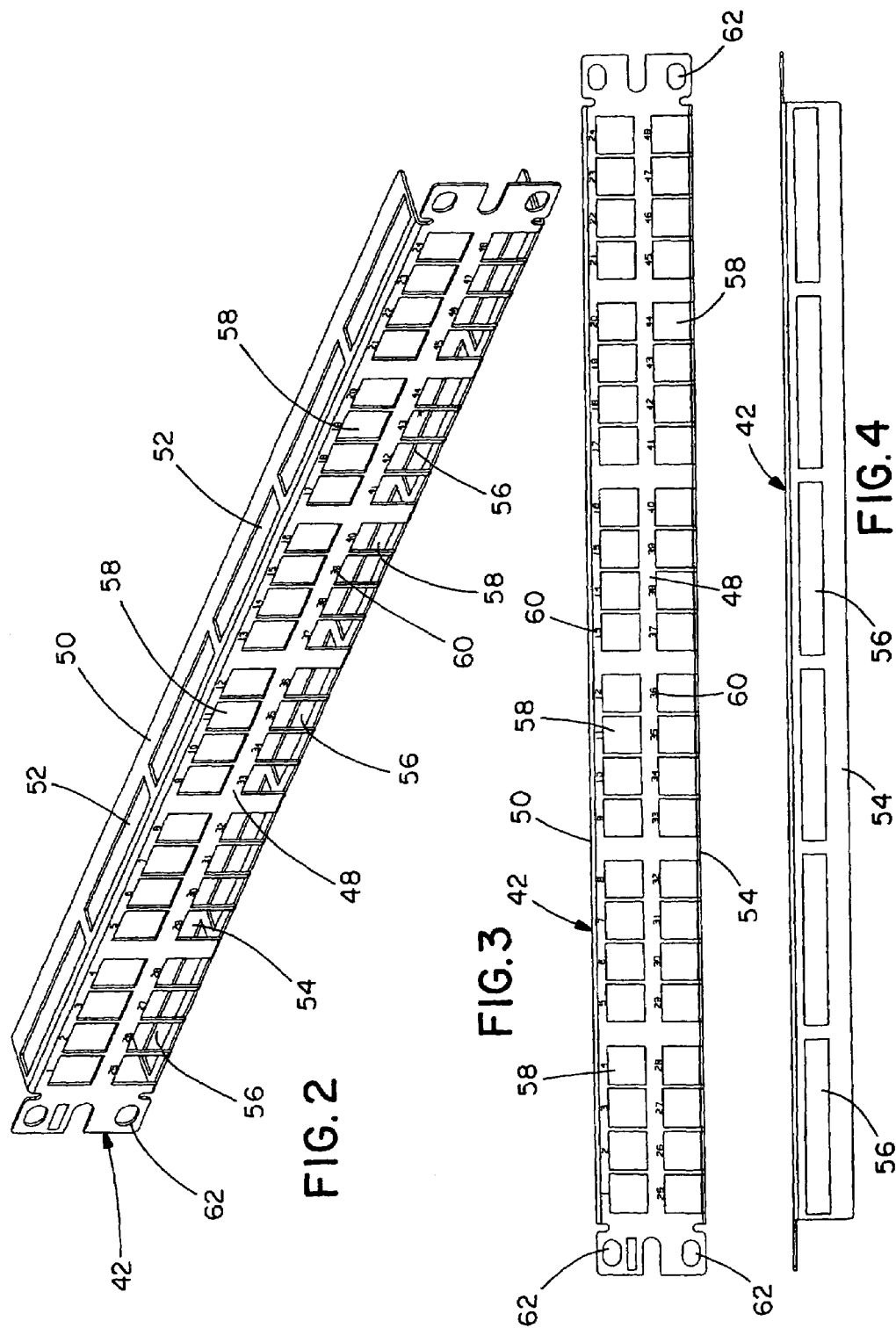

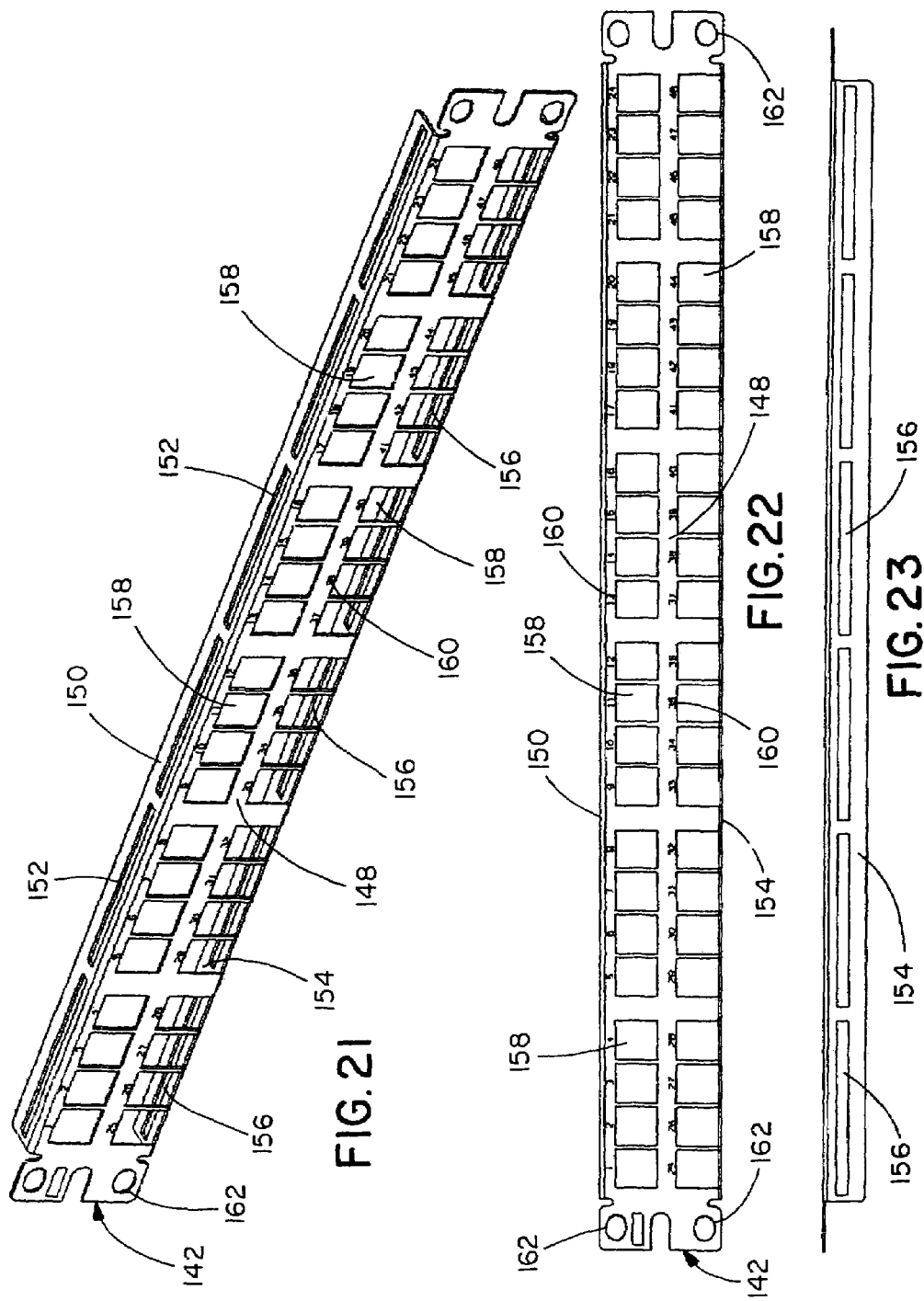

HIGH DENSITY KEYSTONE JACK PATCH PANEL

CROSS REFERENCE TO RELATED APPLICATIONS

This application claims priority to U.S. Provisional Application Ser. No. 60/470,262, filed May 14, 2003, entitled High Density Keystone Jack Patch Panel, and U.S. Provisional Application Ser. No. 60/486,682, filed Jul. 11, 2003, entitled High Density Keystone Jack Patch Panel, each of which is incorporated herein by reference.

BACKGROUND OF THE INVENTION

The present invention is directed to a patch panel and, more particularly, a high density patch panel for housing a total of 48 keystone style modular jacks in one EIA/TIA rack unit.

Keystone style modular jacks made in accordance with industry standards are well known in the telecommunications industry. Patch panel frames that support keystone style modular jacks in one rack space and that mount to any standard EIA/TIA rack are also known. For example, Hubbell's Premise Wiring UDX Series Jack Panels and Molex's 1U48 Port Power Cat 5e Patch Panel are 48-port panels having frames that mount to any standard EIA/TIA rack unit. However, prior art devices either fail to accommodate the industry standard keystone style modular jacks, or mount the modular jacks directly into the rear of the patch panel frame. One attempt at improving patch panel density can be seen in co-pending application Ser. No. 10/814,877, filed Mar. 31, 2004, entitled High Density Patch Panel, the entirety of which is incorporated herein by reference. Accordingly, improvement in the art of maximizing patch panel density for keystone style modular jacks is desired.

It would be desirable to provide an improved patch panel for supporting 48 standard keystone style modular jacks in one EIA/TIA rack unit.

It would also be desirable to provide an improved patch panel having two rows, each row including a plurality of keystone style modular jacks mounted therein, with at least two keystone style modular jacks vertically aligned within the patch panel.

It would further be desirable to provide an improved patch panel with keystone style modular jacks mounted therein oriented such that the release lever of a plug mounted therein is operated in a vertical direction.

It would also be desirable to provide an improved patch panel with keystone style modular jacks mounted therein oriented such that the contacts of a twisted pair modular jack are facing down.

SUMMARY OF THE INVENTION

A patch panel is disclosed. The patch panel includes a frame, a faceplate mountable to the frame, and at least one keystone style modular jack mountable into a rear side of the faceplate. The frame has a top flange and a bottom flange, and the frame includes a plurality of openings. The faceplate is mountable to the frame within the top flange and the bottom flange, and the faceplate has a plurality of mounting openings.

Preferably, the frame has two panel sections angled outwardly in an inverted V-shape, and the frame receives six faceplates. The top flange of the frame has a plurality of first apertures that receive at least one first faceplate retention member. Similarly, the bottom flange of the frame has a plurality of second apertures that receive at least one second faceplate retention member.

Preferably, the frame has a center bar extending horizontally from a first end thereof to a second end thereof, and the frame has a plurality of first mounting apertures at the first end and a plurality of second mounting apertures at the second end. Moreover, the frame includes indicia centered above each modular jack position.

Preferably, the faceplate is mountable into a rear side of the frame. The faceplate includes a front face, at least one top retention member, at least one middle retention member and at least one bottom retention member. Each of the top, middle and bottom retention members are spaced from the front face to define a plurality of recesses.

Preferably, the faceplate has eight mounting openings, and a center section divides the eight mounting openings into two rows of four mounting openings. Moreover, each modular jack is mounted to the faceplate in the same orientation, and at least two modular jacks are vertically aligned within the patch panel.

Preferably, the patch panel includes forty-eight keystone style modular jacks within one rack unit.

BRIEF DESCRIPTION OF FIGURES

FIG. 2 is a top front right perspective view of the frame utilized in the patch panel of FIG. 1;

FIG. 3 is a front view of the frame of FIG. 2;

FIG. 4 is a bottom view of the frame of FIG. 2;

FIG. 21 is a top front right perspective view of the frame utilized in the patch panel of FIG. 20;

FIG. 22 is a front view of the frame of FIG. 21;

FIG. 23 is a bottom view of the frame of FIG. 21;

DETAILED DESCRIPTION OF PREFERRED EMBODIMENTS

The illustrated embodiments of the invention are directed to a high density patch panel utilizing six, eight-position faceplates for a total of 48 ports in one rack unit. One rack unit is 1.75 inches high under the EIA/TIA standard. FIGS. 1–19 are directed to patch panel 40, and FIGS. 20–33 are directed to patch panel 140.

Figure 1:
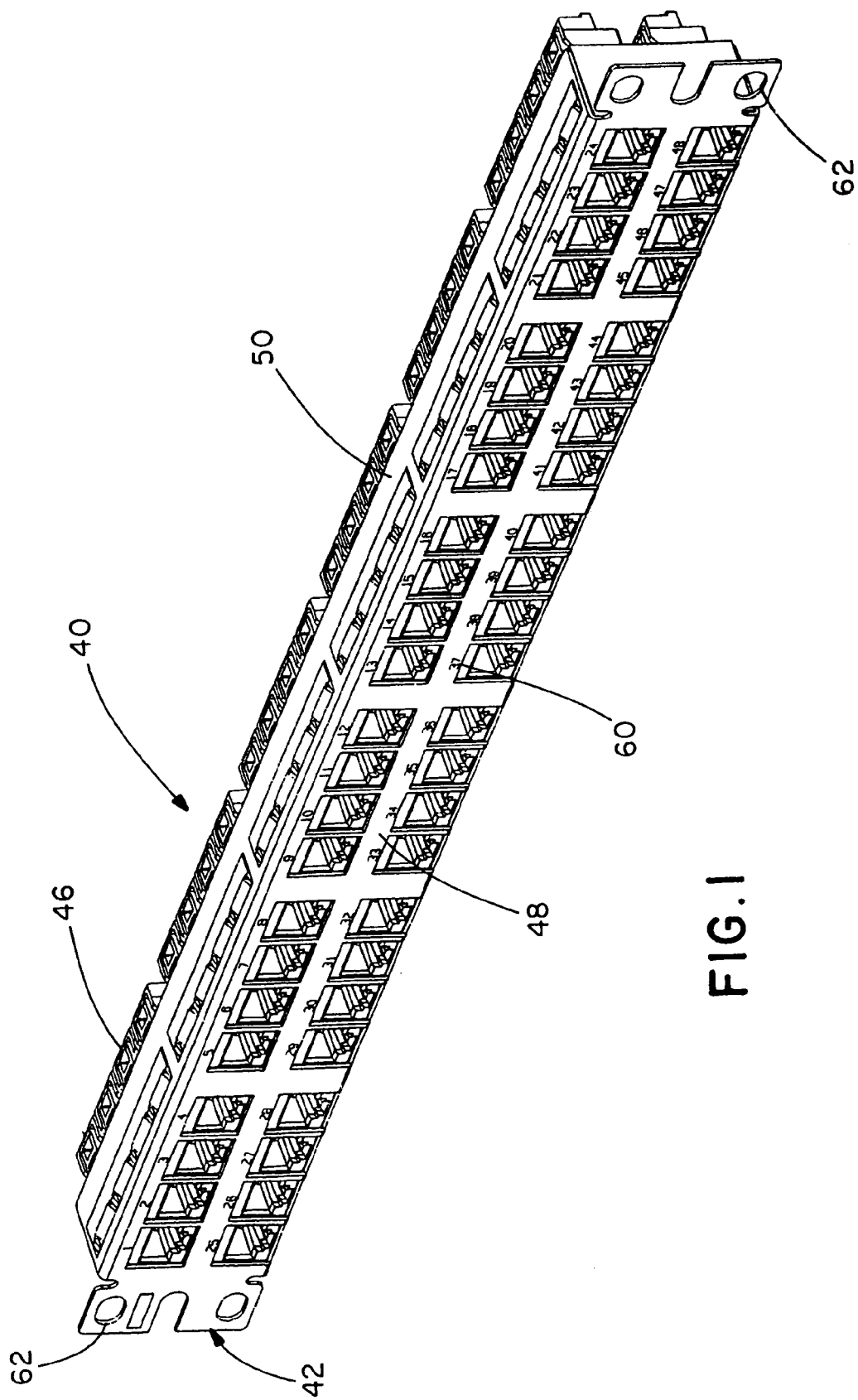
FIG. 1 is a top front right perspective view of a patch panel according to the present invention.

FIG. 1 shows a fully assembled high density patch panel 40. The patch panel 40 includes a frame 42 (see FIGS. 2–4), a plurality of faceplates, such as faceplate 44 (see FIGS. 5–8), and a plurality of keystone style modular jacks, such as modular jack 46 (see FIGS. 9–12). Preferably, the frame 42 is metal, and the faceplate 44 is plastic. However, it is likewise contemplated that the frame 42 and the faceplate 44 may be made of various materials.

As can be seen in FIGS. 1–3, the patch panel 40 has six, eight-position faceplates 44. However, it is likewise contemplated that the patch panel 40 may include any number of faceplates having any number of positions. For example, the patch panel 40 may include four, twelve-position faceplates or twelve, four-position faceplates.

FIGS. 2–4 show the frame 42. Although the frame 42 is straight, it is likewise contemplated that the frame 42 may be angled, as disclosed in U.S. patent application Ser. No. 09/916,923, entitled Angled Patch Panel with Cable Support Bar for Network Cable Racks, the disclosure of which is incorporated by reference. The frame 42 has a center bar 48 that runs the horizontal length of the frame 42 and adds strength to the frame 42. As best seen in FIG. 2, the frame 42 has a top flange 50 including a plurality of rectangular apertures, such as aperture 52. Similarly, as shown in FIGS. 2 and 4, the frame 42 has a bottom flange 54 including a plurality of rectangular apertures, such as aperture 56. As will be described in more detail below, the apertures 52, 56 allow the faceplates 44 to be snapped into the rear side of the frame 42 and allow the modular jacks 46 to be snapped into the faceplates 44.

As best seen in FIGS. 2 and 3, the frame 42 has a plurality of openings 58 for receiving a plurality of keystone style modular jacks, such as modular jack 46 shown in FIGS. 9–12. Indicia 60, such as numbers 1–48, are silk-screened and centered above each module position for identifying each individual port on the frame 42. The frame 42 also includes a plurality of mounting apertures, such as mounting aperture 62, for securing the frame 42 to any standard EIA/TIA 19-inch rack.

Figure 5:
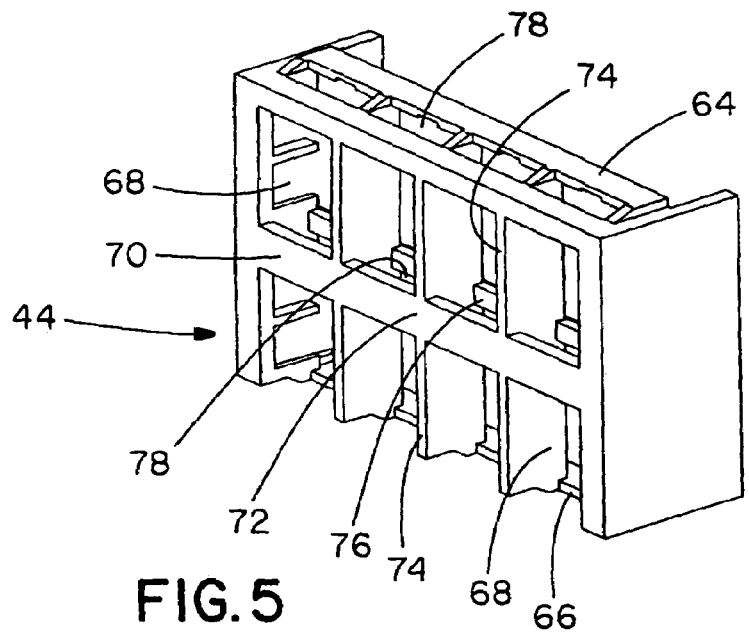
FIG. 5 is a top front right perspective view of one of the faceplates utilized in the patch panel of FIG. 1.

FIGS. 5–8 show the faceplate 44. As best seen in FIG. 5, the faceplate 44 has a top retention bar 64. Similarly, as also seen in FIG. 5, the faceplate 44 has a bottom retention bar 66. The retention bars 64 and 66 engage with apertures 52, 56, respectively, to allow the faceplate 44 to be snapped into the frame 42, as shown in FIGS. 13–15.

Figure 6:
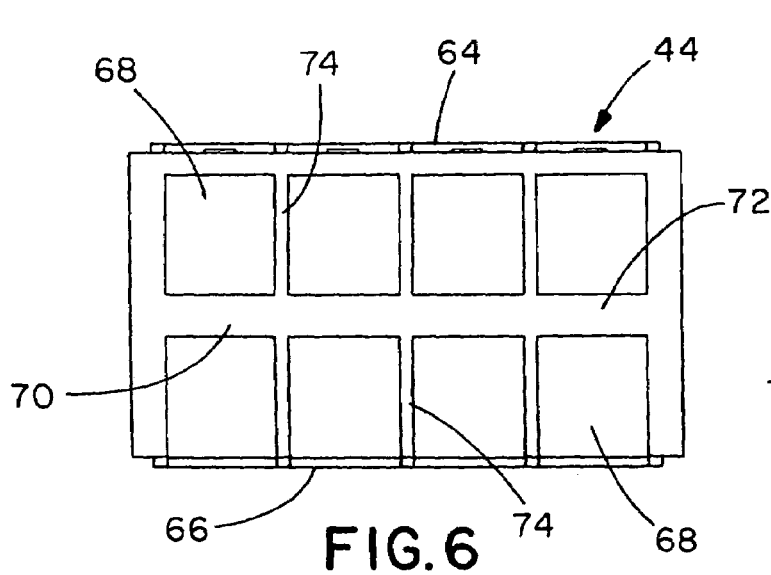
FIG. 6 is a front view of the faceplate of FIG. 5.
Figure 7:
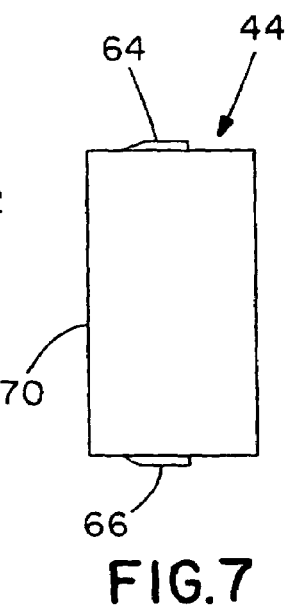
FIG. 7 is a right side view of the faceplate of FIG. 5.
Figure 8:
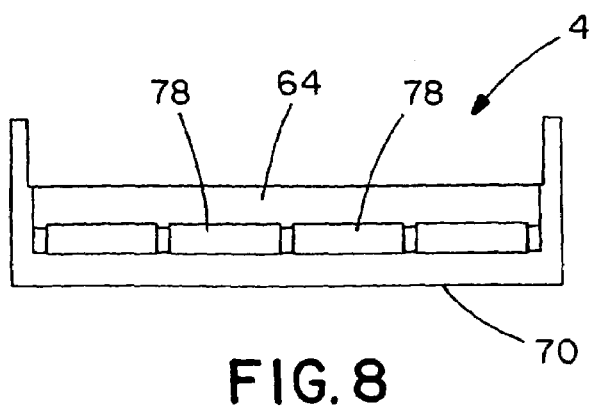
FIG. 8 is a top view of the faceplate of FIG. 5.
Figure 9:
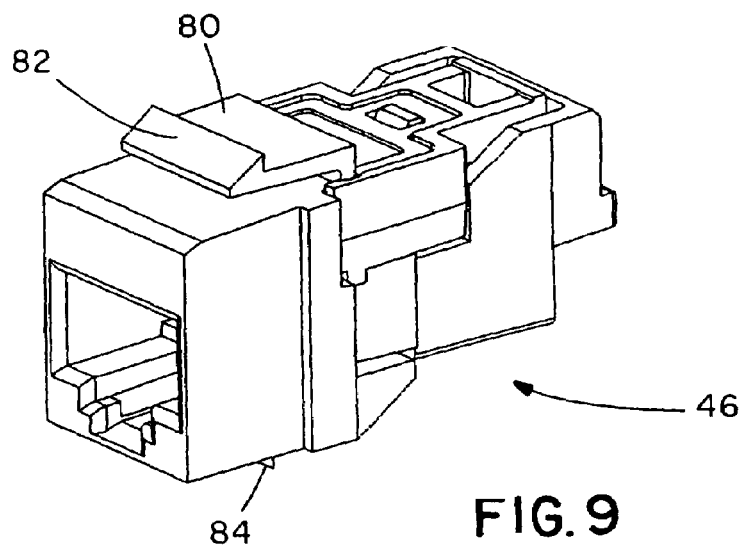
FIG. 9 is a top front right perspective view of one of the keystone style modular jacks utilized in the patch panel of FIG. 1.
Figure 10:
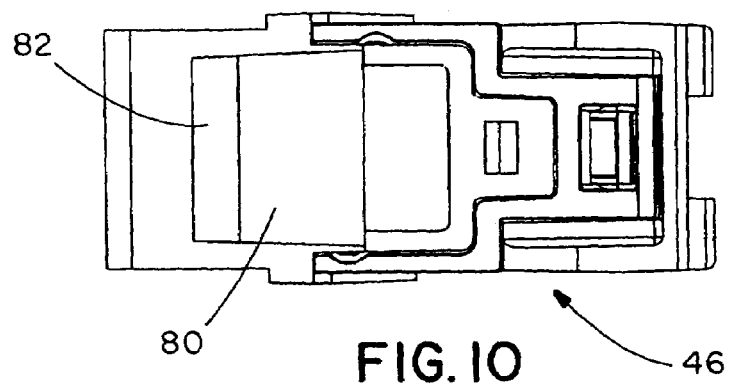
FIG. 10 is a top view of the keystone style modular jack of FIG. 9.
Figures 11, 12:
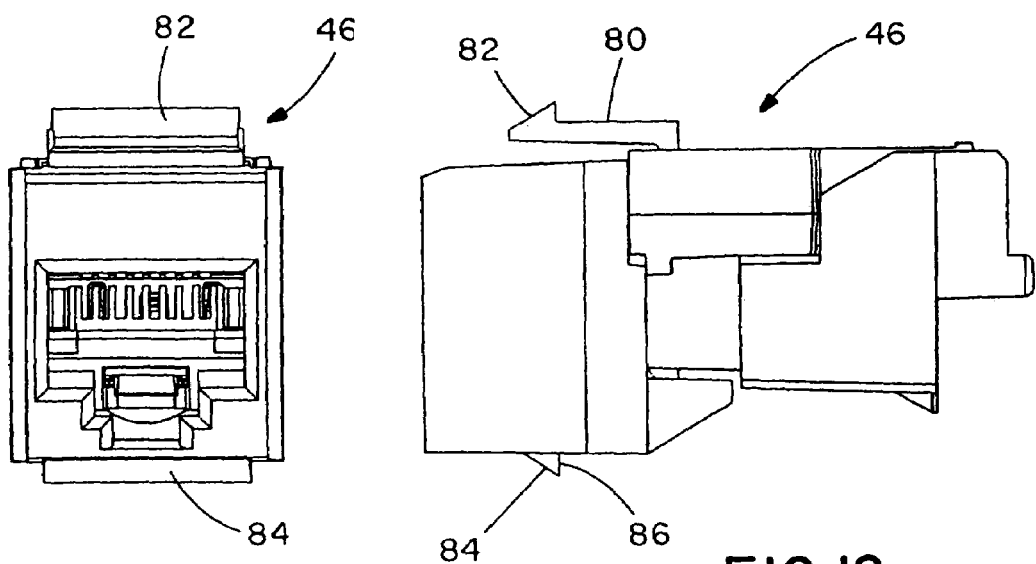
FIG. 11 is a front view of the keystone style modular jack of FIG. 9.
FIG. 12 is a right side view of the keystone style modular jack of FIG. 9.

As best seen in FIGS. 5 and 6, the faceplate 44 has eight mounting openings 68 along its front face 70, separated into two rows of four by a center section 72 and three vertically oriented separator sections 74. Each mounting opening 68 accommodates a keystone style modular jack, such as modular jack 46. The faceplate 44 includes a middle retention bar 76, in addition to the top and bottom retention bars 64 and 66. Each of the three retention bars 64, 66 and 76 is spaced from the front face 70 of the faceplate 44 so as to provide recesses 78 at both the top and bottom of each mounting opening for engaging with the top and bottom latches, respectively, formed on the keystone style modular jacks, which will be described in more detail below.

Figure 19:
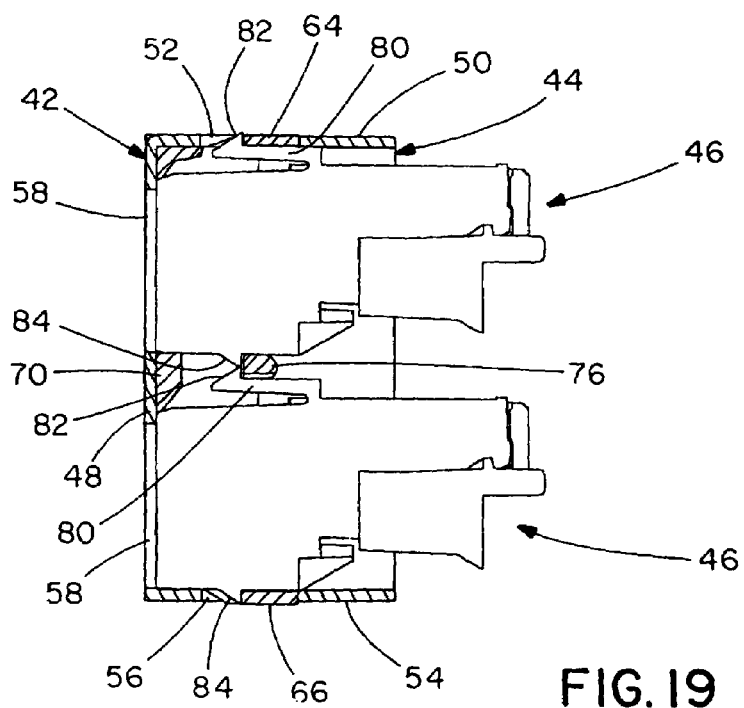
FIG. 19 is a right side sectional view of the faceplate, showing two keystone style modular jacks after insertion into the faceplate with the faceplate inserted into the patch panel frame.

FIGS. 9–12 disclose a standard keystone style modular jack 46 utilizing a standard keystone style latch mechanism. In a standard keystone style modular jack, a forwardly extending cantilevered latch 80 having a stop surface 82, in conjunction with a raised angled rib 84 having a stop surface 86 on the opposing side of the modular jack, secures the modular jack 46 within a mounting opening. As best seen in FIG. 19, latch 80 and rib 84 are secured within the top and bottom recesses, respectively, formed in each of the mounting openings of the faceplate 44.

Figure 13:
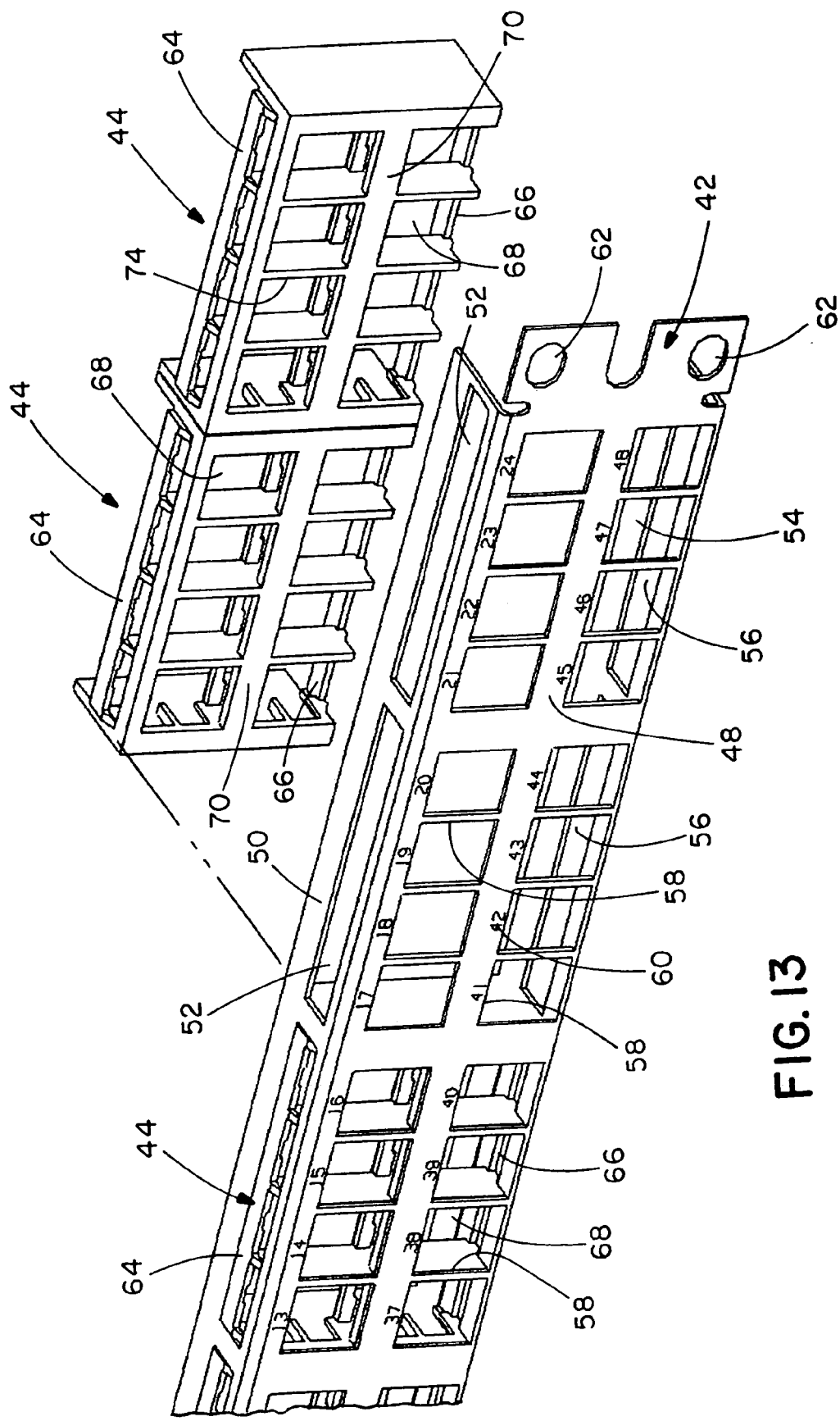
FIG. 13 is a partial exploded top front right perspective view of FIG. 1, showing the faceplates being inserted into the rear of the patch panel frame.
Figure 14:
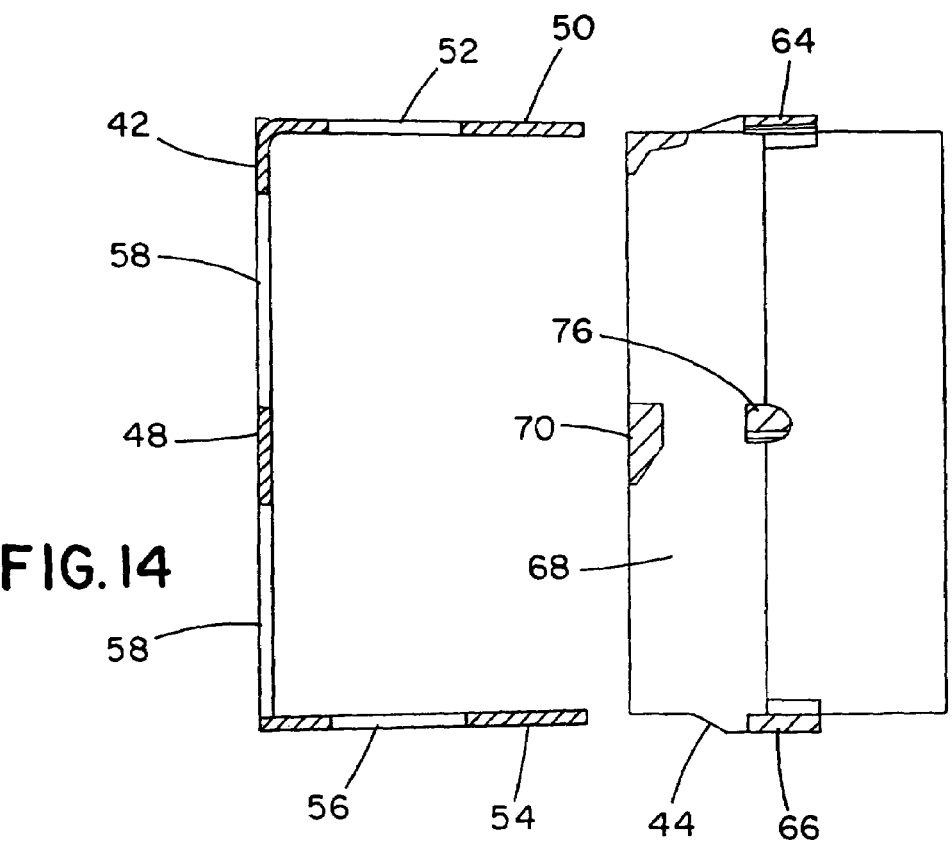
FIG. 14 is a right side sectional view of the faceplate, showing the faceplate prior to insertion into the patch panel frame.
Figure 15:
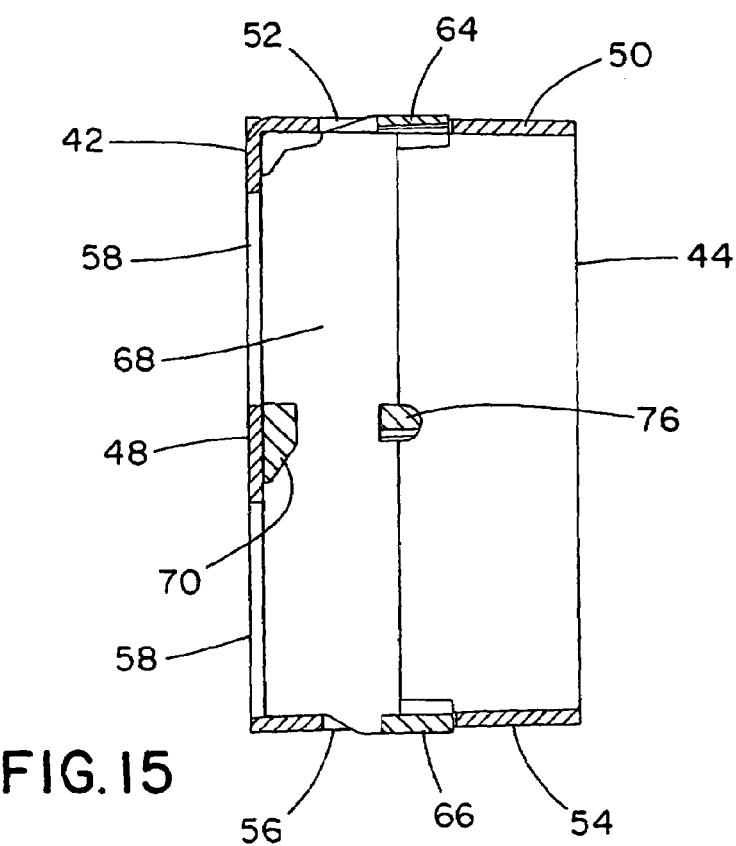
FIG. 15 is a right side sectional view of the faceplate, showing the faceplate after insertion into the patch panel frame.
Figure 16:
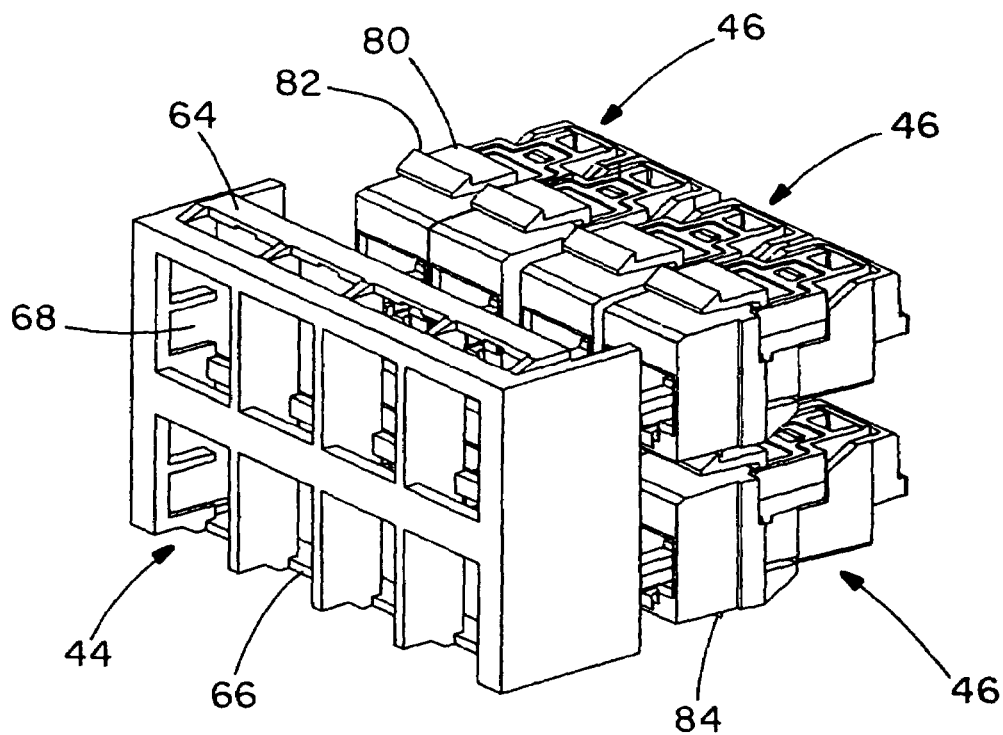
FIG. 16 is an exploded top front right perspective view showing keystone style modular jacks prior to insertion into the faceplate.
Figure 17:
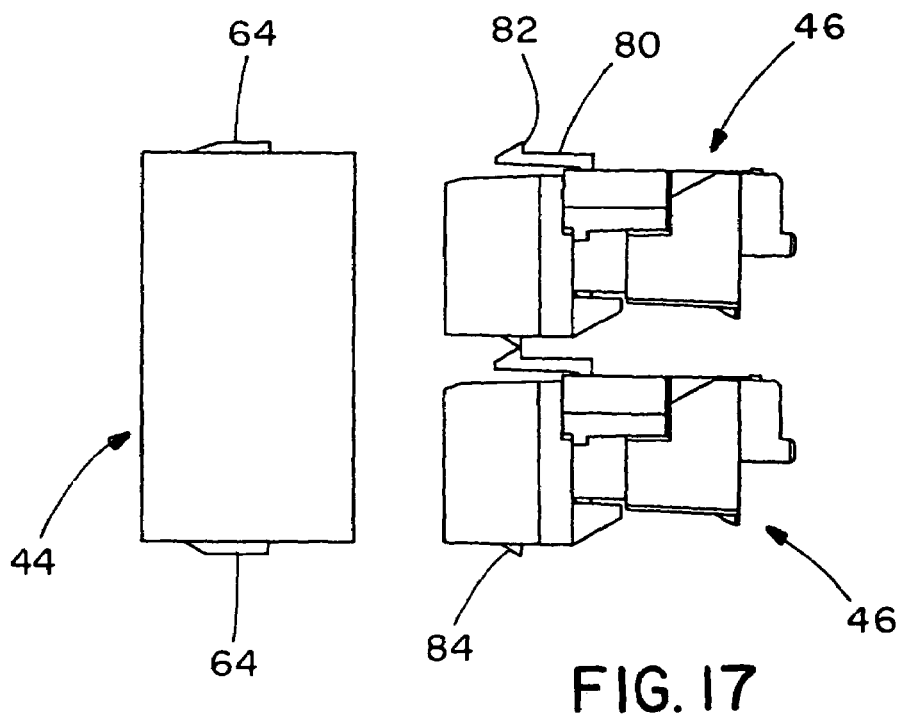
FIG. 17 is a right side view showing two keystone style modular jacks prior to insertion into the faceplate.
Figure 18:
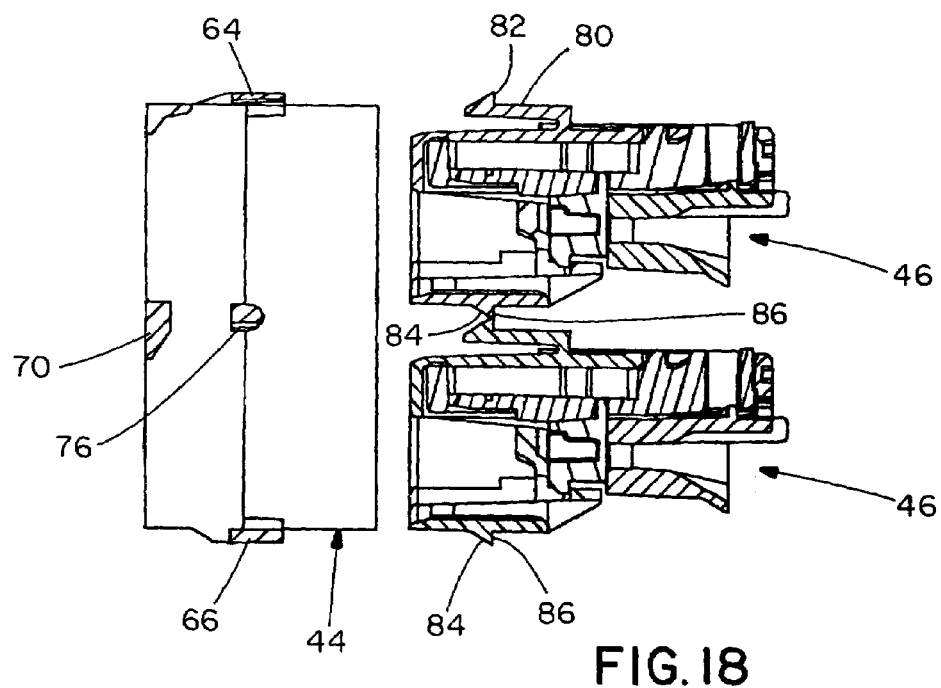
FIG. 18 is a right side sectional view of the faceplate, showing two keystone style modular jacks prior to insertion into the faceplate.

In operation, the faceplate 44 is snap-fitted into the rear of the frame 42, as best seen in FIGS. 13–15. Once all six faceplates are inserted into the rear of the frame 42, the plurality of keystone style modular jacks 46 are inserted into the rear of the faceplates. FIGS. 16–18 show the keystone style modular jacks 46 prior to insertion into the faceplate 44. Conversely, FIG. 19 shows the modular jacks 46 after insertion into the faceplate 44. The cantilevered latch 80 snap fits into top recess 78 and stop surface 82 abuts the forward end of top retention bar 64. Similarly, rib 84 snaps into middle recess 78 and stop surface 86 abuts the forward end of middle retention bar 76.

Figure 20:
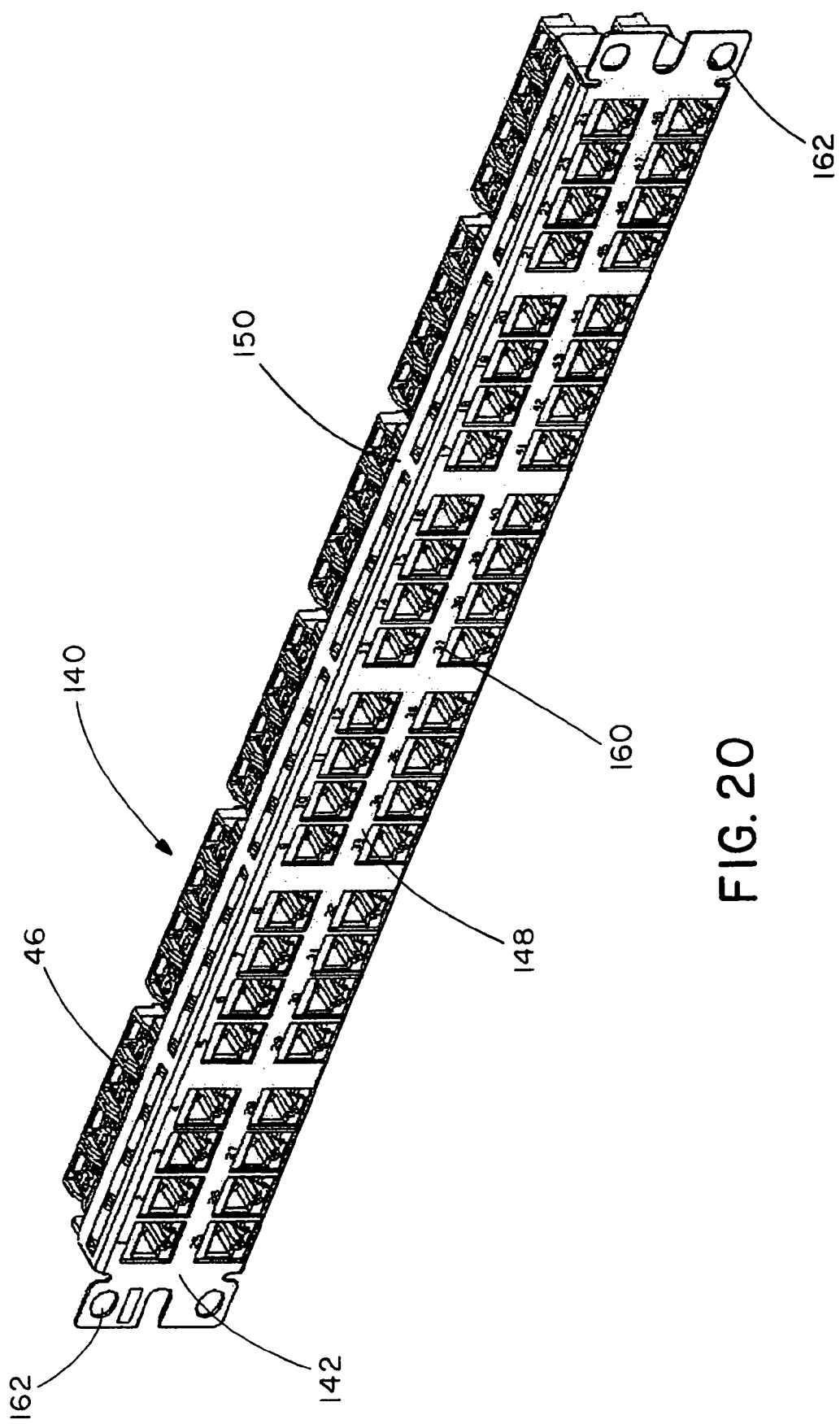
FIG. 20 is a top front right perspective view of a patch panel according to a second embodiment of the present invention.

FIGS. 20–33 are directed to a second embodiment of a high density patch panel accommodating keystone style modular jacks mounted therein. FIG. 20 shows a fully assembled high density patch panel 140. The patch panel 140 includes a frame 142 (see FIGS. 21–23), a plurality of faceplates, such as faceplate 144 (see FIGS. 24–27), and a plurality of keystone style modular jacks, such as modular jack 46 (see FIGS. 9–12). Preferably, the frame 142 is metal, and the faceplate 144 is plastic. However, it is likewise contemplated that the frame 142 and the faceplate 144 may be made of various materials.

As can be seen in FIGS. 20–22, the patch panel 140 has six, eight-position faceplates 144. However, it is likewise contemplated that the patch panel 140 may include any number of faceplates having any number of positions. For example, the patch panel 140 may include four, twelve-position faceplates or twelve, four-position faceplates.

FIGS. 21–23 show the frame 142. Although the frame 142 is straight, it is likewise contemplated that the frame 142 may be angled, as disclosed in U.S. patent application Ser.

Figure 28:
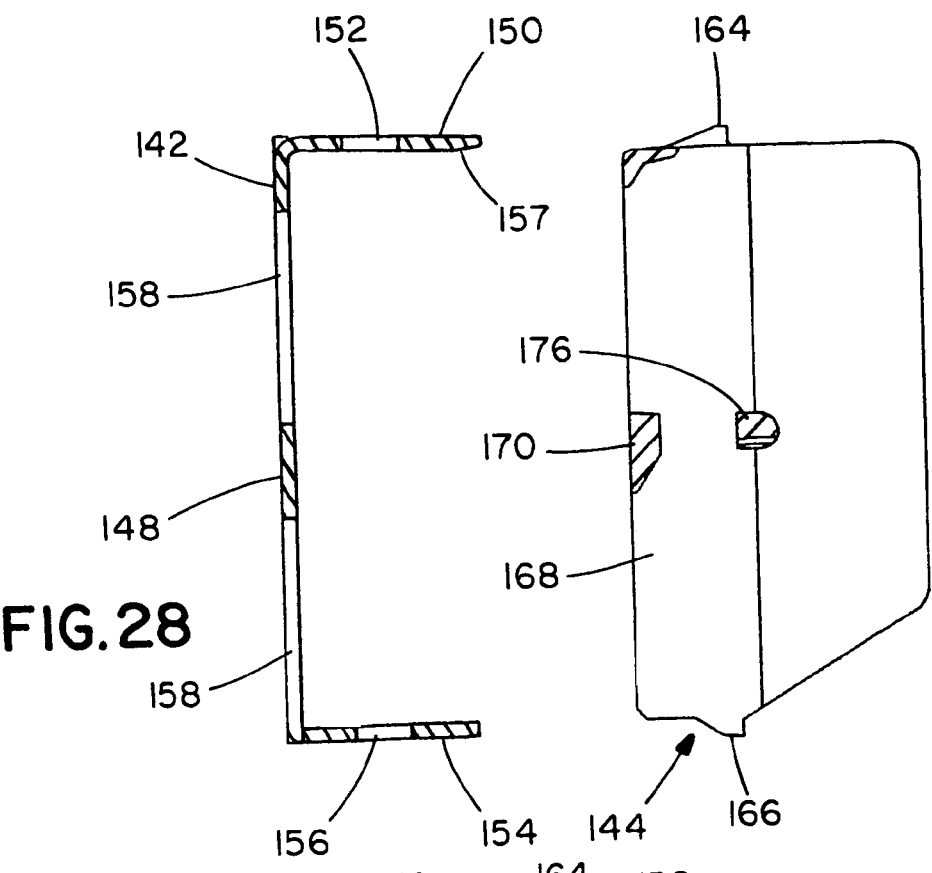
FIG. 28 is a right side sectional view of the faceplate of FIG. 24, showing the faceplate prior to insertion into the patch panel frame of FIG. 21.
Figure 29:
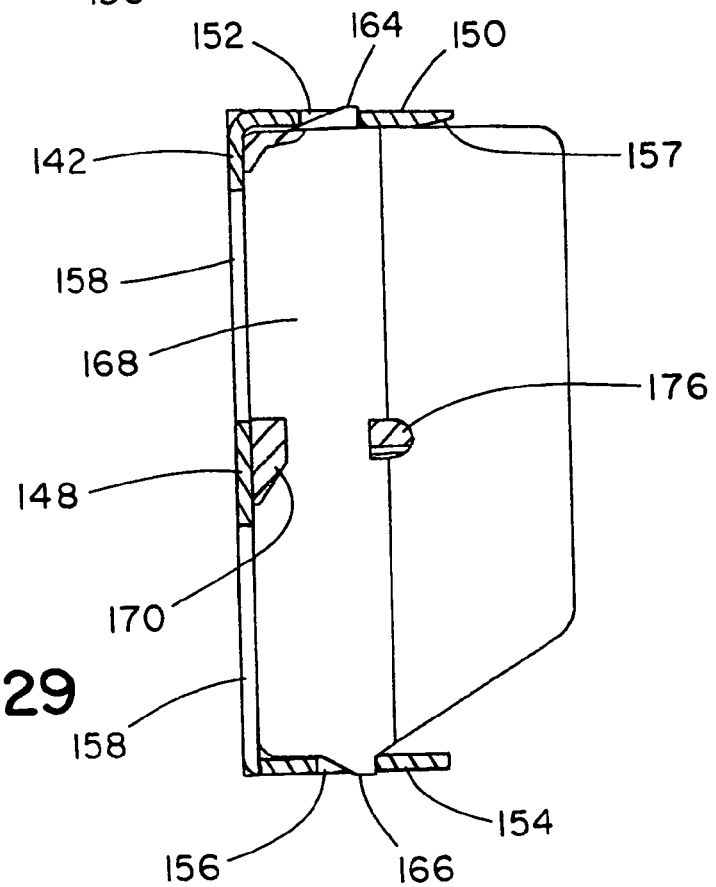
FIG. 29 is a right side sectional view of the faceplate of FIG. 24, showing the faceplate after insertion into the patch panel frame of FIG. 21.
Figure 33:
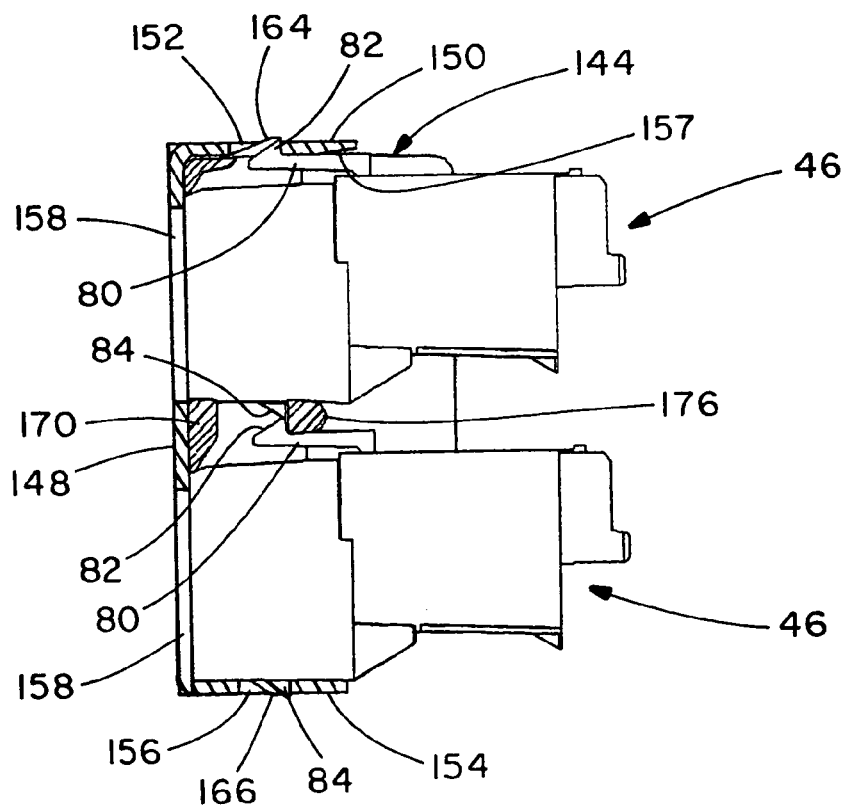
FIG. 33 is a right side sectional view of the faceplate, showing two keystone style modular jacks after insertion into the faceplate with the faceplate inserted into the panel frame.

No. 09/916,923, entitled Angled Patch Panel with Cable Support for Network Cable Racks, the disclosure of which is incorporated by reference. The frame 142 has a center bar 148 that runs the horizontal length of the frame 142 and adds strength to the frame 142. As best seen in FIG. 21, the frame 142 has a top flange 150 including a plurality of rectangular apertures, such as aperture 152. Similarly, as shown in FIGS. 21 and 23, the frame 142 has a bottom flange 154 including a plurality of rectangular apertures, such as aperture 156. As will be described in more detail below, the apertures 152, 156 allow the faceplates 144 to be snapped into the rear side of the frame 142 and allow the modular jacks 46 to be snapped into the faceplates 144. Additionally, as shown in FIGS. 28, 29 and 33, the top flange 150 may be provided with a chamfered edge 157 to allow access by a tool, such as a screwdriver, to ease the release of the faceplate 144 from the frame 142.

As best seen in FIGS. 21 and 22, the frame 142 has a plurality of openings 158 for receiving a plurality of keystone style modular jacks, such as modular jack 46 shown in FIGS. 9–12. Indicia 160, such as numbers 1–48, are silk-screened and centered above each module position for identifying each individual port on the frame 142. The frame 142 also includes a plurality of mounting apertures, such as mounting aperture 162, for securing the frame 142 to any standard EIA/TIA 19-inch rack.

Figure 24:
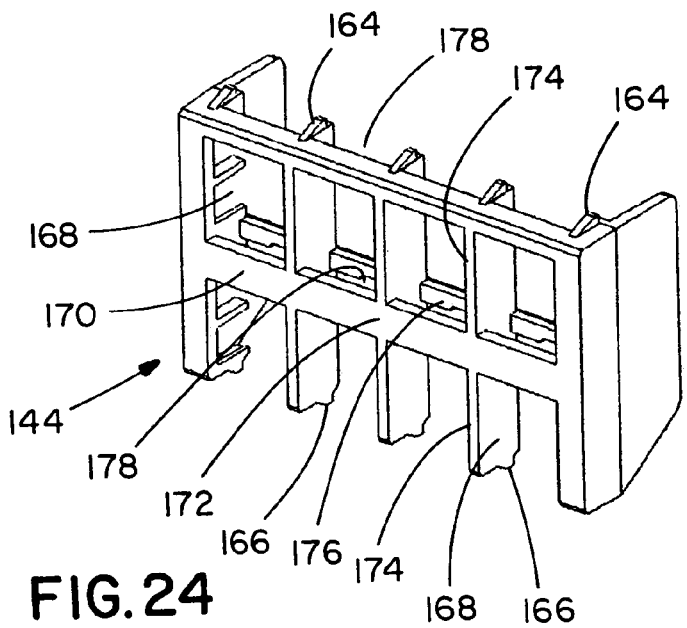
FIG. 24 is a top front right perspective view of one of the faceplates utilized in the patch panel of FIG. 20.

FIGS. 24–27 show the faceplate 144. As best seen in FIG. 24, the faceplate 144 has a plurality of top retention snaps 164. Similarly, as also seen in FIG. 24, the faceplate 144 has a plurality of bottom retention snaps 166. A plurality of top and bottom openings are formed between the retention snaps 164 and 166. The retention snaps 164 and 166 engage with apertures, 152, 156, respectively, to allow the faceplate 144 to be snapped into the frame 142, as shown in FIGS. 28 and 29.

Figure 25:
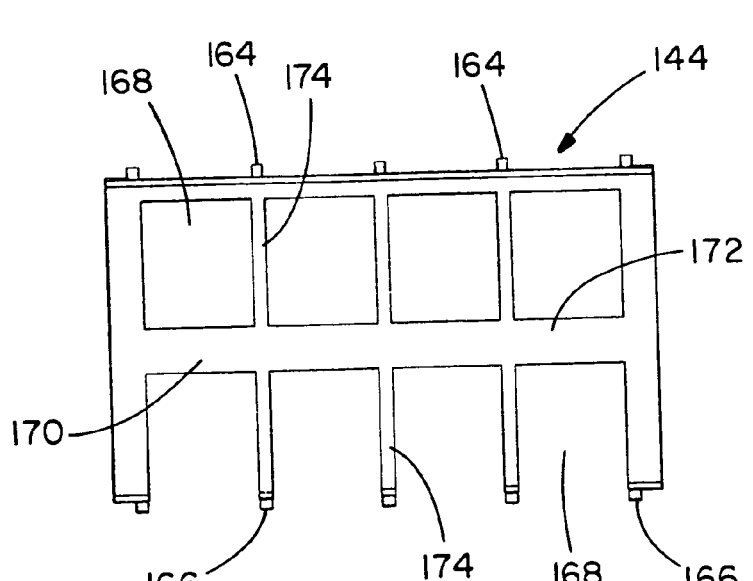
FIG. 25 is a front view of the faceplate of FIG. 24.
Figure 26:
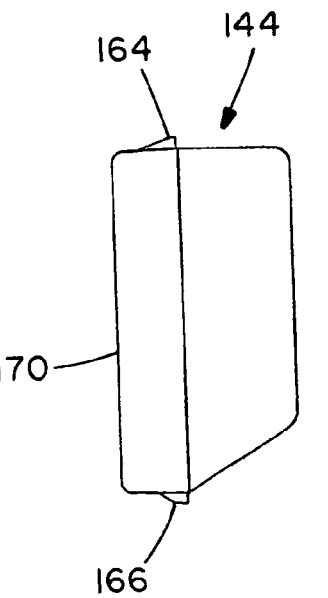
FIG. 26 is a right side view of the faceplate of FIG. 24.
Figure 27:
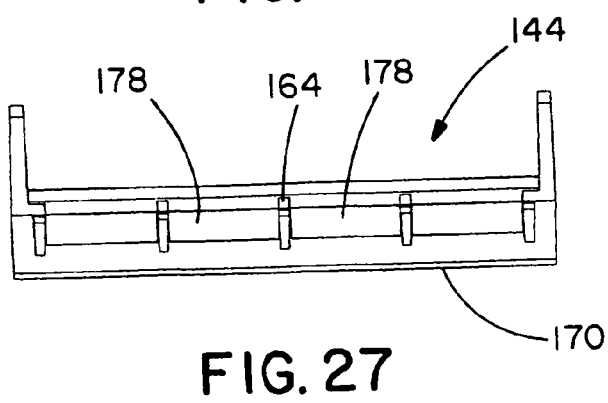
FIG. 27 is a top view of the faceplate of FIG. 24.

As best seen in FIGS. 24 and 25, the faceplate 144 has eight mounting openings 168 along its front face 170, separated into two rows of four by a center section 172 and three vertically oriented separator sections 174. Each mounting opening 168 accommodates a keystone style modular jack, such as modular jack 46. The faceplate 144 includes a middle retention bar 176. The retention bar 176 is spaced from the front face 170 of the faceplate 144 so as to provide recesses 178 for engaging with the top and bottom latches formed on the keystone style modular jacks, which will be described in more detail below.

Figure 30:
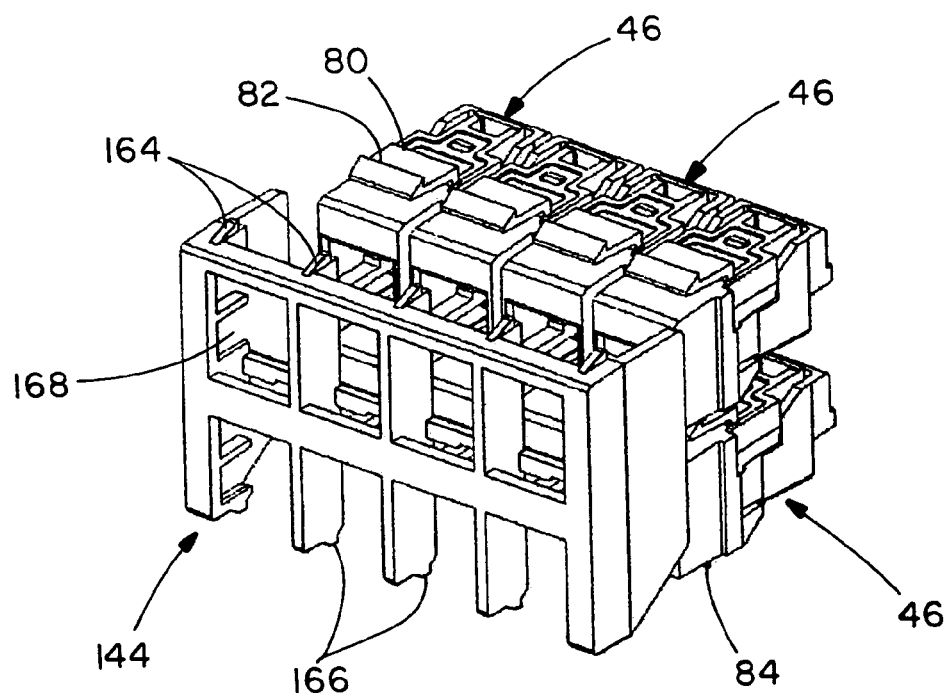
FIG. 30 is an exploded top front right perspective view showing keystone style modular jacks prior to insertion into the faceplate.
Figure 31:
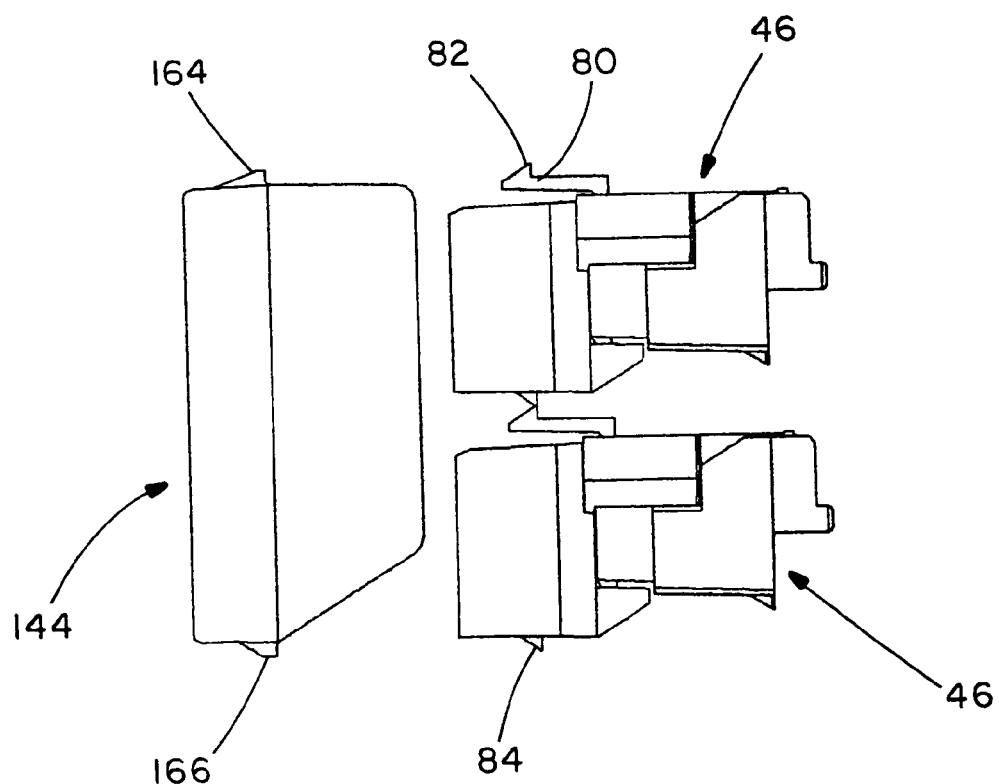
FIG. 31 is a right side view showing two keystone style modular jacks prior to insertion into the faceplate.
Figure 32:
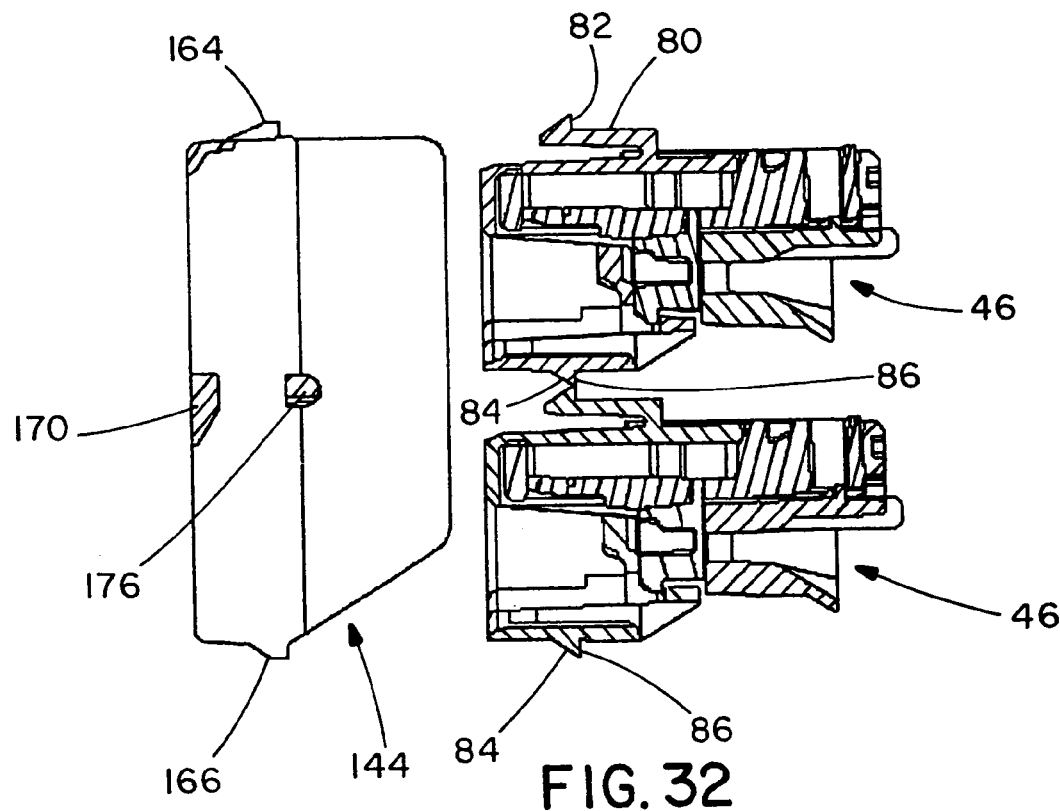
FIG. 32 is a right side sectional view of the faceplate of FIG. 24, showing two keystone style modular jacks prior to insertion into the faceplate.

In operation, the faceplate 144 is snap-fitted into the rear of the frame 142, as best seen in FIGS. 28 and 29. Once all six faceplates are inserted into the frame 142, the plurality of keystone style modular jacks 46 are inserted into the rear of the faceplates. FIGS. 30–32 show the keystone style modular jack 46 prior to insertion into the faceplate 144. Conversely, FIG. 33 shows the modular jacks 46 after insertion into the faceplate 144. As best seen in FIG. 33, the cantilevered latch 80 snap fits into a top opening and stop surface 82 abuts the forward end of top flange 150. Similarly, rib 84 snaps into recess 178 and stop surface 86 abuts the forward end of middle retention bar 176.

The disclosed invention provides a high density patch panel accommodating keystone style modular jacks to be mounted therein. It should be noted that the above-described and illustrated embodiments and preferred embodiments of the invention are not an exhaustive listing of the forms such a patch panel in accordance with the invention might take; rather, they serve as exemplary and illustrative of embodiments of the invention as presently understood. By way of example, and without limitation, a faceplate having retention members on the side walls thereof is contemplated to be within the scope of the invention. Many other forms of the invention are believed to exist.

The invention claimed is:

1. A patch panel comprising:
   a frame having a top flange and a bottom flange, the frame including a plurality of openings;
   a faceplate mountable to the frame within the top flange and the bottom flange, the faceplate having a plurality of mounting openings and a retention bar spaced from a front face of the faceplate; and
   at least one keystone style modular jack mountable into a rear side of the faceplate,
   wherein the retention bar engages at least one latch formed on the jack.

2. The patch panel of claim 1, wherein the frame receives six faceplates.

3. The patch panel of claim 1, wherein the top flange of the frame has at least one chamfered edge at a rear end thereof.

4. The patch panel of claim 1, wherein the top flange of the frame has a plurality of first apertures and the bottom flange of the frame has a plurality of second apertures.

5. The patch panel of claim 4, wherein at least one of the first apertures receives at least one first faceplate retention snap, and at least one of the second apertures receives at least one second faceplate retention snap.

6. The patch panel of claim 1, wherein the frame has a center bar extending horizontally from a first end thereof to a second end thereof.

7. The patch panel of claim 1, wherein the frame includes indicia centered above each modular jack position.

8. The patch panel of claim 1, wherein the frame has a plurality of first mounting apertures at a first end thereof and a plurality of second mounting apertures at a second end thereof.

9. The patch panel of claim 1, wherein the faceplate is releasably mounted to the frame.

10. The patch panel of claim 1, wherein the faceplate is mounted into a rear side of the frame.

11. The patch panel of claim 1, wherein the faceplate has the front face, at least one top retention snap and at least one bottom retention snap.

12. The patch panel of claim 1, wherein the faceplate has eight mounting openings.

13. The patch panel of claim 12, wherein the faceplate has a center section that divides the eight mounting openings into two rows of four mounting openings.

14. The patch panel of claim 1, wherein each modular jack is releasably mounted to the faceplate and the frame.

15. The patch panel of claim 1, wherein each modular jack is mounted to the faceplate in the same orientation.

16. The patch panel of claim 1, wherein at least two modular jacks are vertically aligned within the patch panel.

17. The patch panel of claim 1, wherein each modular jack is mounted to the faceplate oriented such that twisted pair modular jack contacts face downward.

18. The patch panel of claim 1, further comprising forty-eight keystone style modular jacks within one rack unit.

19. A patch panel comprising:
    a frame having a plurality of openings;
    a faceplate mountable into a rear side of the frame, the faceplate having a plurality of mounting openings and a retention bar spaced from a front face of the faceplate; and
    at least one keystone style modular jack mountable into a rear side of the faceplate,
    wherein the retention bar engages at least one latch formed on the jack.

* * * * *